US006971097B1

United States Patent
Wallman

(10) Patent No.: US 6,971,097 B1
(45) Date of Patent: Nov. 29, 2005

(54) METHOD AND APPARATUS FOR IMPLEMENTING CONCURRENTLY RUNNING JOBS ON AN EXTENDED VIRTUAL MACHINE USING DIFFERENT HEAPS MANAGERS

(75) Inventor: David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 458 days.

(21) Appl. No.: 09/591,172

(22) Filed: Jun. 9, 2000

(51) Int. Cl.$^7$ .............................................. G06F 9/46
(52) U.S. Cl. ...................................... 718/101; 718/102
(58) Field of Search ......... 709/100, 101; 718/100–102

(56) References Cited

U.S. PATENT DOCUMENTS

| | | | |
|---|---|---|---|
| 5,175,679 A | * 12/1992 | Allen et al. | .................... 700/28 |
| 5,561,786 A | * 10/1996 | Morse | ........................ 711/170 |
| 5,745,703 A | * 4/1998 | Cejtin et al. | ................ 709/238 |
| 6,081,665 A | * 6/2000 | Nilsen et al. | ................ 717/116 |

OTHER PUBLICATIONS

Back et al, "Java Operating Systems: Design and Implementation," Aug., 1998, Technical Report UUCS-98-015.
Back et al, "Processes in KaffeOS: Isolation, Resource Management, and Sharing in Java," Apr., 2000, Technical Report UUCS-00-010.
David Raila, "Getting Started with Choices," Sep. 15, 1994.
Ford et al, "The Flux OSKit: A Substrate for Kernel and Language Research," Oct. 1997.
Seligmann et al, "Incremental Mature Garbage Collection Using the Train Algorithm," Mar. 26, 1995.
Berlin et al., "JavaOS Internals," JavaOS Internals, Apr. 4, 1997.

* cited by examiner

*Primary Examiner*—Meng-Al T. An
*Assistant Examiner*—Nilesh Shah
(74) *Attorney, Agent, or Firm*—Beyer Weaver & Thomas, LLP

(57) ABSTRACT

Methods and apparatus for implementing a virtual machine that supports the execution of more than one application per virtual machine process are described. According to one aspect of the present invention, a computing system includes a processor, a memory, and a virtual machine that is in communication with the processor. The virtual machine is arranged to enable one or more jobs to run on the virtual machine, and is further arranged to create a heap in the memory for each job that runs on the virtual machine. In one embodiment, the virtual machine includes a jobs manager, a class manager, and a heap manager. In such an embodiment, the heap manager manages substantially all heaps in the memory that are created by the virtual machine.

22 Claims, 7 Drawing Sheets

METHOD AND APPARATUS FOR IMPLEMENTING CONCURRENTLY RUNNING JOBS ON AN EXTENDED VIRTUAL MACHINE USING DIFFERENT HEAPS MANAGERS

BACKGROUND OF THE INVENTION

1. Field of Invention

The present invention relates generally to computing systems. More particularly, the present invention relates to a virtual machine on which more than one application may run at substantially any given time.

2. Description of the Related Art

As the use of object-based computing systems increases, the use of virtual machines which run with respect to computing systems is becoming more prevalent. A virtual machine may generally be considered to be self-contained operating environment that functions as if it were a separate computing system. By way of example, a virtual machine may be software which acts as an interface between a computer program, e.g., compiled binary code, and a processor which is arranged to execute instructions specified by the computer program.

In general, a virtual machine includes an engine which enables an application or, more specifically, program codes, to be executed by computer hardware. Standard virtual machines engines include components such as an interpreter and a class loader, as will be understood by those skilled in the art. An interpreter perform operations defined byte codes as each byte code is read into the interpreter. A class loader loads classes needed to complete a particular job using the virtual machine.

Virtual machines only support the execution of one application per virtual machine process. In other words, when more than one application is to be executed substantially concurrently, then more than one virtual machine must be started such that each application has its own instance of a virtual machine, i.e., only one application may be executed per virtual machine process. A job is started on a virtual machine for each application. The initialization of a virtual machine generally causes significant performance penalty. In particular, the loading of all classes related to a launched application when a virtual machine is initialized causes a substantial performance penalty.

When multiple virtual machines are initialized to enable more than one application to execute, the existence of the multiple virtual machines is typically relatively expensive. For example, running two virtual machines and, hence, two separate processes on a device with limited memory such as a personal digital assistant may be expensive as much of the limited memory may be used by the two virtual machines. The limited memory may be occupied by the virtual machines themselves. Further, although the virtual machines may utilize common classes, a set of classes is generally resident in memory for each virtual machine. Hence, the limited memory resources are often further used by duplicate classes. In other words, a significant amount of memory is often wasted, as each virtual machine process loads and keeps in memory its own copy of "core" classes, although the majority of the core classes may generally be shared by separate instances of a virtual machine.

A virtual machine typically does not enable applications to be readily persisted, e.g., states associated with the applications may not be readily stored. In order to persist an application, an application programmer must typically explicitly persist the application. That is, the application must "know" how to save its own state or states. By way of example, an application that is started on a personal digital assistant may not be persisted and transferred to another personal digital assistant unless that application includes code specifically associated with persisting the application. The lack of the ability to readily persist data hinders the portability of applications, as will be understood by those skilled in the art.

Typically, a virtual machine is monolithic. That is, a virtual machine is effectively a non-modular system. Hence, when it becomes necessary to alter a line of code associated with the virtual machine, it may be necessary to alter additional lines accordingly. However, in many cases, the identification of additional lines which need to be altered may not be possible until after an error occurs in the execution of the virtual machine. Such an error is likely to cause an overall failure of the virtual machine, as a monolithic virtual machine is generally not robust.

Therefore, what is needed is a virtual machine which does not waste memory or resources, enables applications to be persisted, and is relatively easy to modify. That is, what is desired is an efficient virtual machine.

SUMMARY OF THE INVENTION

The present invention relates to a virtual machine which is modular and enables more than one application to execute per virtual machine process. According to one aspect of the present invention, a computing system includes a processor, a memory, and a virtual machine that is in communication with the processor. The virtual machine is arranged to enable one or more jobs to run on the virtual machine, and is further arranged to create a heap in the memory for each job that runs on the virtual machine. In one embodiment, the virtual machine includes a jobs manager, a class manager, and a heap manager. In such an embodiment, the heap manager manages substantially all heaps in the memory that are created by the virtual machine.

According to another aspect of the present invention, a virtual machine is arranged to operate in cooperation with a computing system. The virtual machine includes a first mechanism for creating at least one job that runs on the virtual machine and a second mechanism, the second mechanism that provides the job with at least one class. In one embodiment, the first mechanism for creating the job is creates a first job and a second job. In such an embodiment, the virtual machine includes a third mechanism that enables information to be exchanged between the first job and the second job.

According to still another aspect of the present invention, a computer-implemented method for executing a first application substantially concurrently with a second application includes creating a first job on a virtual machine and creating a second job on the same virtual machine. The first job is associated with the first application, and the second job is associated with the second application. The method also includes creating a first heap for the first job and creating a second heap for the second job. In one embodiment, the first job and the second job share at least one class.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

Figure 1:
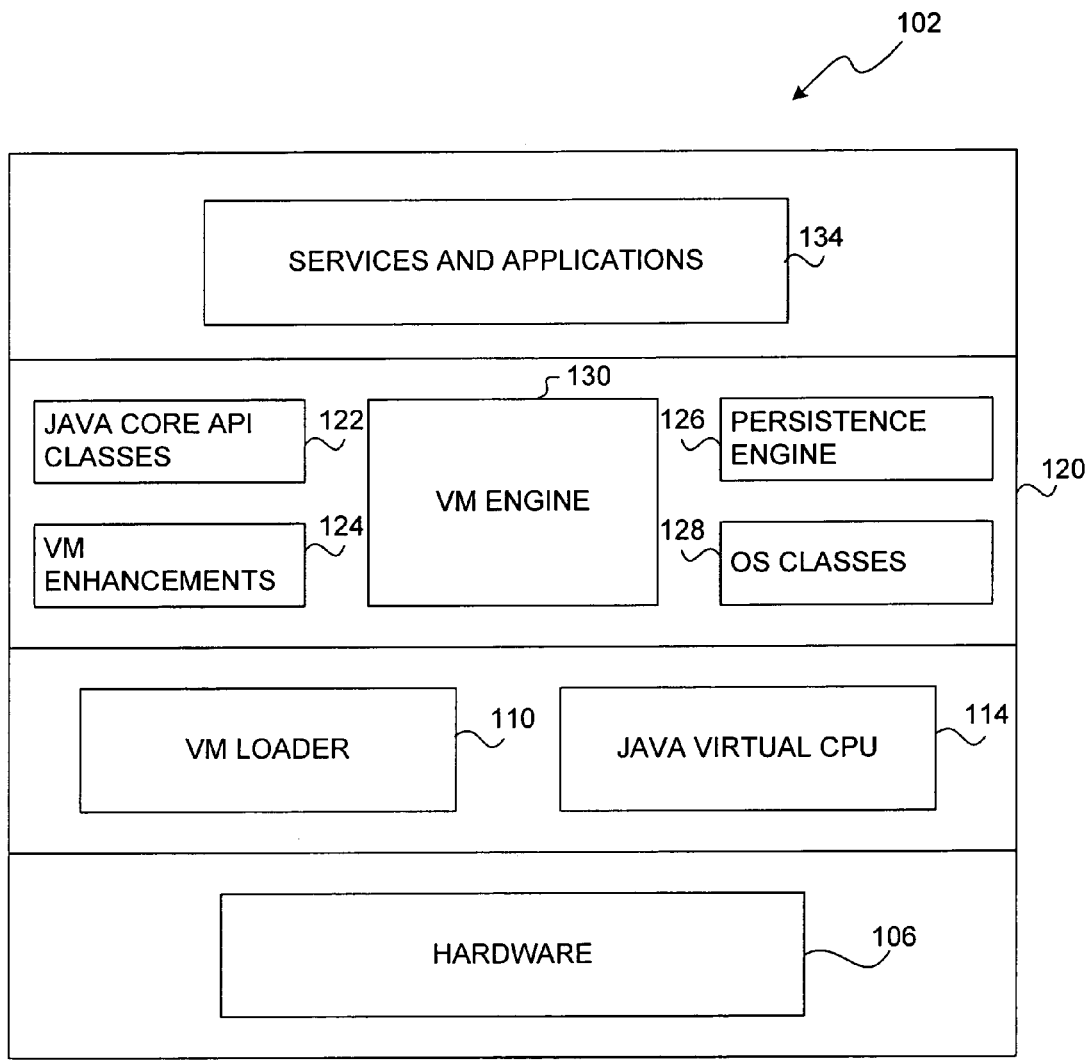
FIG. 1 is a diagrammatic representation of an architecture of a virtual machine in accordance with an embodiment of the present invention.

The initialization and maintenance of multiple conventional virtual machines is needed in order to enable more than one application to execute. In other words, only one application may execute on a virtual machine or virtual machine process. The existence of the multiple virtual machines is typically relatively expensive, particularly when memory resources are limited. In addition, a standard virtual machine does not enable applications to be readily persisted, thereby impeding the overall portability of the applications.

Further, standard virtual machines are monolithic. Hence, when it becomes necessary to alter a line of code to modify a feature associated with the virtual machine, it may be necessary to alter additional sections of code to accommodate the modified feature. As a result, it may be difficult to update or add features to a standard virtual machine. Monolithic virtual machines are also likely to suffer catastrophic failures when a small problem arises. That is, since a monolithic virtual machine is non-modular, any problem experienced within the virtual machine is likely to be propagated throughout the entire virtual machine, thereby compromising the robustness of the virtual machine.

In one embodiment, a virtual machine may be arranged to enable more than one application to execute per virtual machine process. That is, rather than forcing two virtual machines to start when two applications are to be run concurrently, a single virtual machine may support both applications. By enabling more than one application to be supported by a single virtual machine, or virtual machine process, the performance penalties associated with starting up and effectively executing multiple virtual machines may be avoided. Specifically, the performance penalties associated with initializing a virtual machine and loading the necessary classes associated with a launched application may be avoided. It should be understood that the term "job," as used herein, may be considered to be an example of a "process," as will be understood by those skilled in the art.

A virtual machine that enables more than one application to execute per virtual machine process may be a scaleable or modular virtual machine. By maintaining a modular virtual machine with clear internal interfaces rather than a monolithic virtual machine, any changes to computer code associated with one module may be made substantially transparently to other modules. In other words, changes to one module typically do not necessitate changes to other modules. Therefore, different components of the virtual machine may be readily "plugged in" such that a new component with a particular feature may be inserted in place of an older component without affecting other features of the virtual machine. Further, a modular virtual machine may generally be more robust than a monolithic virtual machine, since a failure associated with one module may not cause a catastrophic failure of the entire virtual machine.

In addition, the amount of memory required to load classes for use by a virtual machine in order to enable applications to execute may be reduced through use of the virtual machine which may support more than one application simultaneously. For example, classes that are used by separate instances of a virtual machine are copied such that each instance of a virtual machine has a copy of the classes, even if the classes are common to the instances of the virtual machine. By implementing a virtual machine which supports more than one application at a time, the memory space associated with copies of the same classes may be reduced, as substantially only one copy of each class may be needed.

When a virtual machine which may support more than one application simultaneously starts a job, that job has an associated heap, i.e., its own substantially separate heap. As such, garbage collection may be performed more efficiently. The efficiency of a garbage collection process is improved when there is one heap for each application as opposed to a shared heap because the heap that is not shared is likely to be smaller than the shared heap. Hence, the garbage collection process may occur more quickly, as there is less data on the heap that needs to be scanned by the garbage collector.

Referring initially to FIG. 1, the framework associated with a virtual machine will be described in accordance with an embodiment of the present invention. Specifically, an architecture 102 of which a virtual machine is a part will be described. Architecture 102 includes hardware 106, e.g., processors, which enables a virtual machine to execute. A virtual machine loader 110 and a virtual central processing unit (CPU) 114, as for example a Java™ virtual CPU developed by Sun Microsystems, Inc. of Palo Alto, Calif., are arranged to operate using hardware 106. As will be appreciated by those skilled in the art, virtual machine loader 110 is arranged to load and to initialize a virtual machine. Virtual CPU 114 is arranged to encapsulate native methods, and may be arranged to simulate core applications programming interfaces such as Java™ core applications programming interfaces developed by Sun Microsystems, Inc. of Palo Alto, Calif. Virtual CPU 114 may, in one embodiment, also be arranged to enable privileged byte codes to access hardware 106, and to simulate operating systems, drivers, and tools.

A virtual machine 120 which is part of architecture 102 includes a virtual machine engine 130, which will be described below with respect to FIG. 2. Also included as a part of virtual machine 120 are a set of core applications programming interface classes 122, a set of virtual machine enhancements 124, a persistence engine 126, and a set of operating system classes 128. Persistence engine 126 may be arranged to enable services and applications 134, which run on processes associated with virtual machine 120, to be persistent without requiring application-specific code associated with persistence. In general, virtual machine 120 interfaces with virtual machine loader 110 and virtual CPU 114 to operate using hardware 106, while services and applications 134 execute in processes associated with virtual machine 120.

Figure 2:
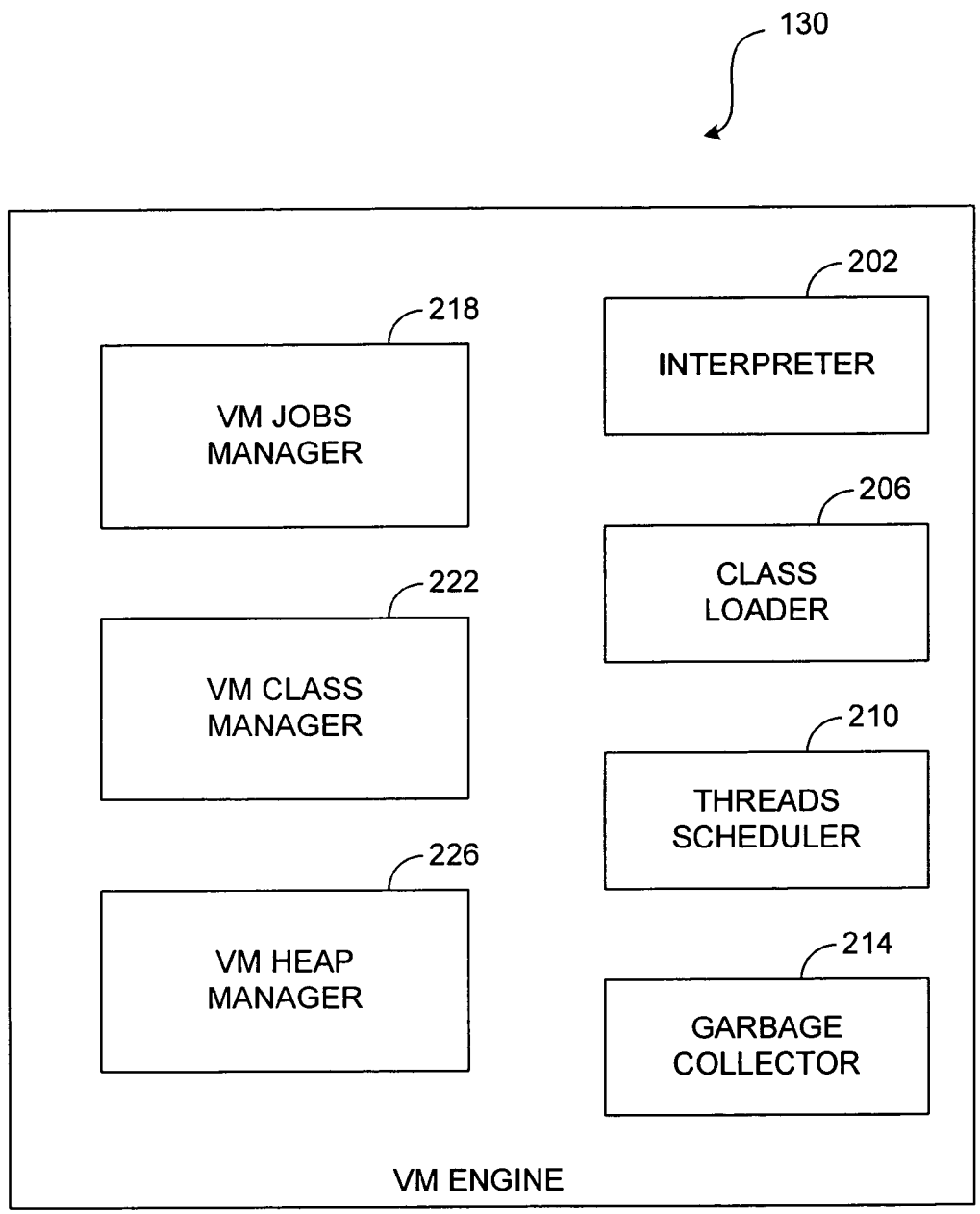
FIG. 2 is a diagrammatic representation of a virtual machine engine, i.e., virtual machine engine 130 of FIG. 1, in accordance with an embodiment of the present invention.

FIG. 2 is a diagrammatic representation of a virtual machine engine, i.e., engine 130 of FIG. 1, in accordance with an embodiment of the present invention. Engine 130 and, hence, the overall virtual machine in which engine 130 is a part, is modular. By maintaining modularity within engine 130, the robustness of engine 130 may be increased. For example, modifying one module associated with engine 130 typically does not require modifying another module in response to modifications made to the one module.

Engine 130 includes "standard" components such as an interpreter 202 and a class loader 206. Engine 130 also includes a threads scheduler 210 and a garbage collector 214. Threads scheduler 210 schedules threads which are associated with virtual machine engine 130. In the described embodiment, each job created by a virtual machine or, more specifically, virtual machine engine 130, has a dedicated native thread. As such, threads scheduler 210 may schedule multiple threads such that substantially only one thread has access to a given resource at any particular time. It should be appreciated that when a job has more than one associated thread, the threads may be implemented as virtual machine level threads. It should be understood that threads scheduler 210 is optionally included in engine 130, as an operating system is typically also capable of scheduling threads.

Garbage collector 214 performs garbage collection, e.g., incremental garbage collection, on each heap that is created for a job. A separate garbage collector is arranged to perform garbage collection on each heap that is created for each job. That is, each job has a separate heap which, in turn, has a separate instance of a garbage collector. An example of a suitable garbage collector will be discussed below with respect to FIG. 6.

In the described embodiment, engine 130 includes a virtual machine jobs manager module 218, a virtual machine class manager module 222, and a virtual machine heap manager module 226. It should be appreciated, however, that in other embodiments, the modules may be combined into fewer modules. By way of example, jobs manager 218 may be integrated with class manager 222 to form a single module. Alternatively, additional modules may be included within engine 130.

Jobs manager 218 is manages jobs within a virtual machine. As previously mentioned, when an application is executed on a virtual machine, a job that corresponds to the application is created on the virtual machine, and a dedicated heap is created for each job. Within engine 130, more than one job may run simultaneous.

Class manager 222 is arranged such that if separate, i.e., different, jobs include references to a common set of classes, the classes may be shared among the separate jobs. The sharing of classes among different jobs will be described below in more detail with reference to FIG. 4. Class manager 222 also includes additional functionality such as the ability to perform security checks, the ability to monitor the availability of classes, and the ability to effectively unload classes which are no longer in use, e.g., through reference counting.

Heap manager 226 manages heaps within a virtual machine. The managed heaps are allocated by the virtual machine, and stored in memory, for each job that is stared by the virtual machine. As previously discussed, a virtual machine creates a heap for every job that is started by the virtual machine. In addition to managing heaps, heap manager 226 may increase the size of a heap of an active application or job, e.g., by taking some heap space from the heap of an inactive application or job. Heap manager 226 may also persist the heap of an inactive application, and allocate substantially the entire heap of the inactive application to any active application which requires additional heap space. That is, heap manager 226 may persistently store the information from a heap off of the heap, as for example on another machine, such that space associated with the heap may be reallocated for other purposes. Heap manager 226 may further be utilized to prevent an application or a particular set of applications from consuming substantially all available memory, thereby causing engine 130 to effectively freeze such that engine 130 is prevented from operating. The general function of heap manager 226 will be discussed below with respect to FIG. 5.

Figure 3:
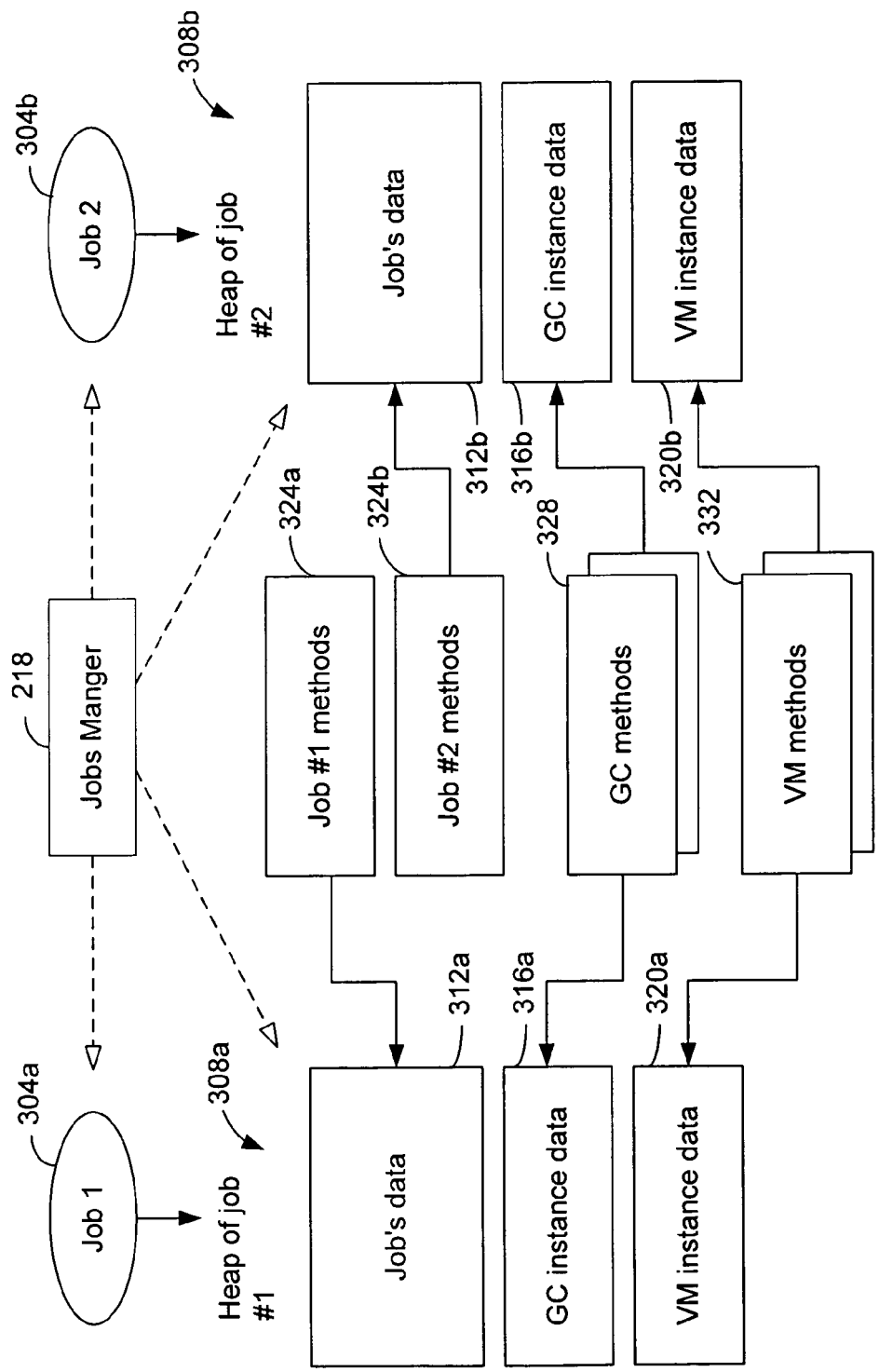
FIG. 3 is a diagrammatic representation of the sharing of methods between two heaps which are created by a jobs manager, i.e., jobs manager 218 of FIG. 2, in accordance with an embodiment of the present invention.

With reference to FIG. 3, the functionality of a jobs manager, i.e., jobs manager 218, will be described in accordance with an embodiment of the present invention. Specifically, the functionality of jobs manager 218 will be described in the context of a Java™ virtual machine implemented using the Java™ programming language, developed by Sun Microsystems, Inc. of Palo Alto, Calif. It should be appreciated that although jobs manager 218 will be described in the context of a Java™ virtual machine implemented using the Java™ programming language, jobs manager 218 may generally be associated with substantially any suitable virtual machine implemented using any suitable programming language.

In general, jobs manager 218 may create jobs 304 and, hence, heaps 308 that are associated with jobs 304. Typically, in creating heaps 308, e.g., a new heap 308 for a new job, jobs manager 218 may create jobs data 312, garbage collection instance data 316, and virtual machine instance data 320. It should be appreciated that in one embodiment, jobs data 312, garbage collection instance data 316, and virtual machine instance data 320 are all located on heap 308. Jobs data 312, which includes objects allocated to a job, has associated methods 324. Similarly, garbage collection instance data 316, which includes objects allocated to a garbage collector, is associated with garbage collection methods 328, and virtual machine instance data 320, which includes objects allocated to a virtual machine, is associated with virtual machine methods 332. Although different jobs 304 are often associated with different sets of job methods 324, e.g., job 304a is associated with methods 234a while job 304b is associated with methods 324b, there are situations in which at least some methods may be shared between jobs 304.

Figure 4:
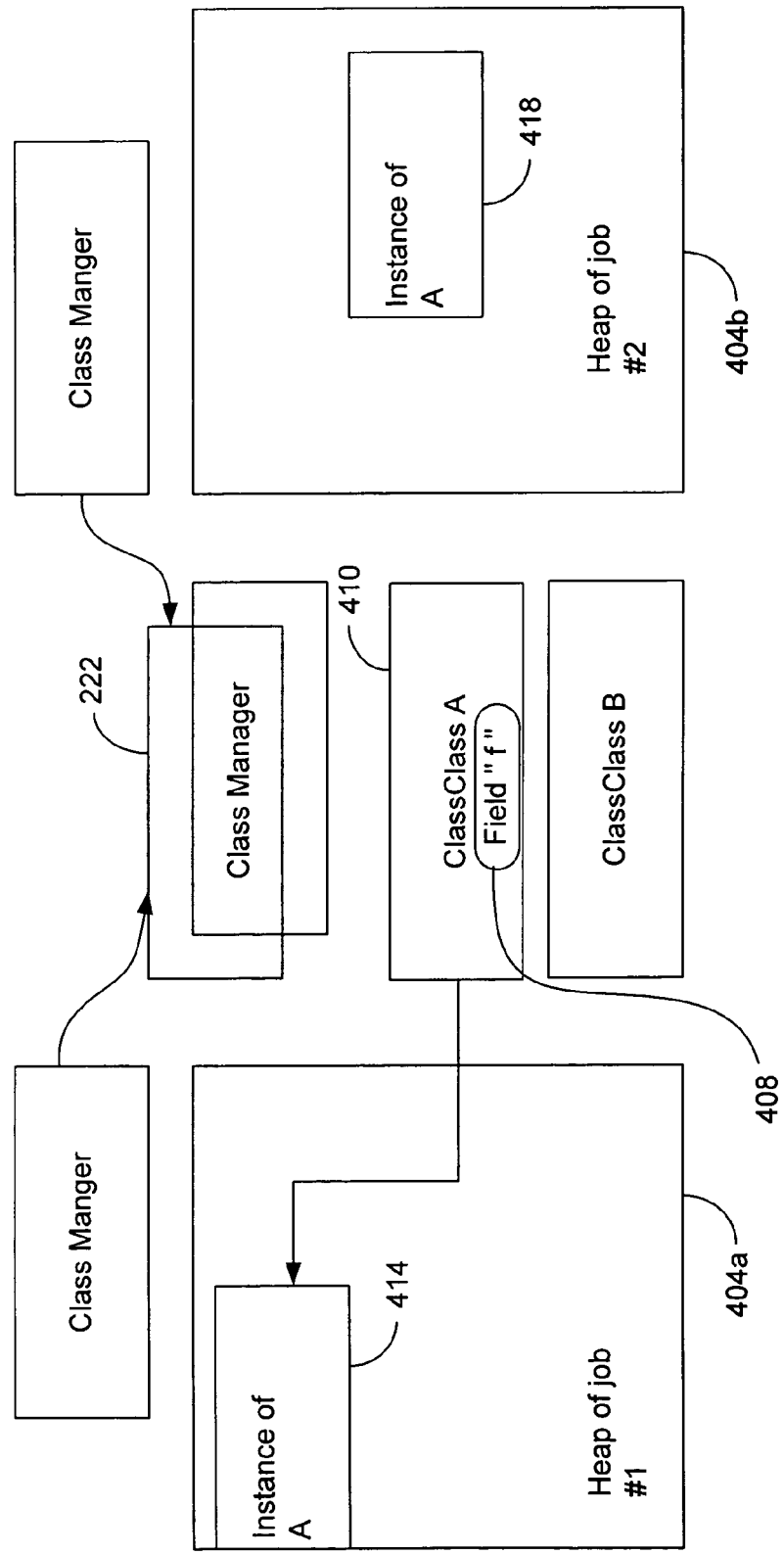
FIG. 4 is a diagrammatic representation of the sharing of classes between two jobs executing on a virtual machine in accordance with an embodiment of the present invention.

FIG. 4 is a diagrammatic representation of the sharing of classes between two jobs executing on a virtual machine in accordance with an embodiment of the present invention. That is, FIG. 4 illustrates the sharing of classes between different jobs started by a virtual machine, as made possible by a class manager, i.e., class manager 222 of FIG. 2. Sharing classes between different jobs started by a virtual machine allows memory space to be conserved, and may reduce the code bloat associated with defining effectively redundant classes.

In general, class manager 222 enables classes, e.g., resolved classes, to be shared among separate jobs which each have an associated heap 404. Specifically, class manager 222 performs security checks on classes and additionally tracks, e.g., performs bookkeeping on, the classes. In addition, class manager 222 may also perform reference counting and unload those classes which are no longer in use.

A first job that is associated with heap 404 may include an instance 414 of a class A 410 which is associated with class manager 222. When the first job attempts to change a field "f" 408 within class A 410, as long as no other job, e.g., a second job that is associated with heap 404b, has an instance of class A 410 or is otherwise currently operating on class A 410, the first job is allowed to change field "f" 408. When the second job has an instance 418 of class A 410 and acquired its instance 418 after instance 414 was acquired by the first job, then the first job may be allowed to change field "f" 408. In such a situation, when the second job attempts to change field "f" 408, class manager 222, according to one implementation, creates proxy data that includes a proxy field "f" which the second job may change. The proxy data is arranged to disappear once instance 418 is no longer in use, or when the second job has completed its operations on instance 418. The use of proxy data may prevent access issues that arise when more than one job attempts to change a field that is associated with class A 410. In other words, the use of proxy data effectively enables classes to be shared.

In one embodiment, proxy data may also be created to include a proxy field "f" when the first job attempts to make a change to field "f" 408. Generally, when proxy data is created, class manager 222 checks each proxy field for uniqueness, as will be understood by those skilled in the art.

When a class or classes are shared between applications such that instances of the class or classes are present on the heaps of jobs created for the applications, the class or classes may have at least one static field. Field "f" 408 may be such a static field. As such, when jobs associated with heaps 404 each want to set field "f" 408, proxy data is created by class manager 222 once class manager 222 identifies shared class A 408. The proxy data enables field "f" 408 to remain substantially static.

Class manager 222 allows data to be readily exchanged between applications and, hence, jobs associated with heaps 404. Further, class manager 222 enables applications to be persisted such that, for example, an application may be started on a personal digital assistant, persisted, and transferred to another personal digital assistant or other device.

Figure 5:
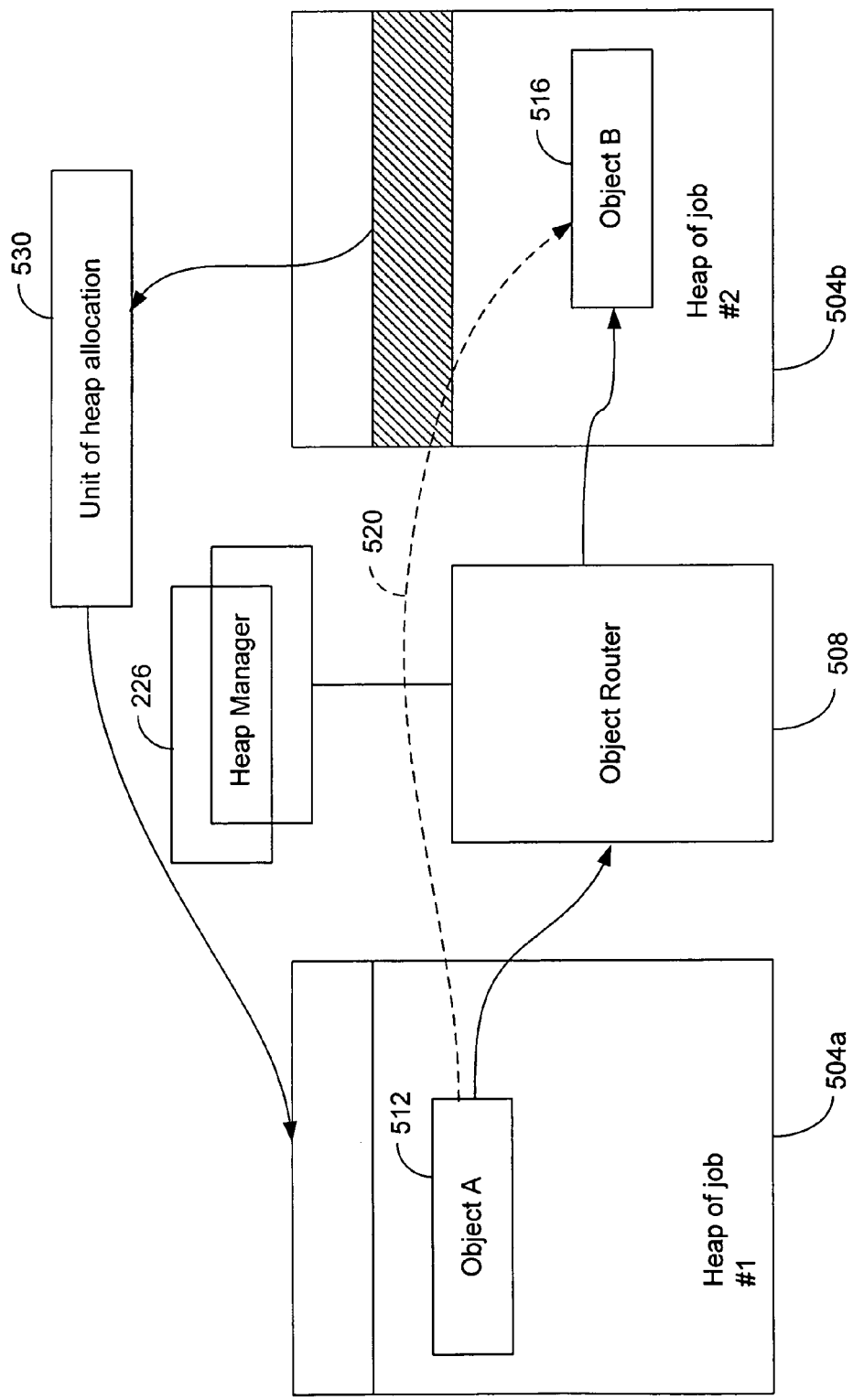
FIG. 5 is a diagrammatic representation of the functionality of a heap manager, i.e., heap manager 226 of FIG. 2, in accordance with an embodiment of the present invention.

As mentioned above with respect to FIG. 2, a heap manager is used to manage substantially all heaps in a virtual machine. With reference to FIG. 5, the functionality of a heap manager, i.e., heap manager 226 of FIG. 2, will be described in accordance with an embodiment of the present invention. Heap manager 226 enables data to be exchanged between different jobs, each of which has an associated heap 504. Specifically, in one embodiment, heap manager 226 allows data exchange between heaps 504 using an object router 508. Object router 508 is a mechanism that allows an object A 512 allocated on heap 504a to effectively be visible to an object B 516 on heap 504b, and vice versa.

Object router 508 also stores object tracking information. By storing object tracking information using object router 508, a garbage collector may then use the information to perform a garbage collection on each heap 504 independently. A garbage collection process will be discussed in more detail below with respect to FIG. 6. When object router 508 stores object tracking information, object router 508 effectively tracks and stores object references between heaps 504. When object router 508 identifies and stores references to objects, e.g., object 512 and 516, object router 508 may prevent the removal of object references and, hence, objects which are still needed.

The use of object router 508 enables data to be exchanged between different applications, i.e., the applications associated with heaps 504, efficiently. Specifically, since applications associated with heaps 504 may run on a common machine using a single virtual machine, data exchange may occur using object router 508 instead of pipes or sockets. By communicating through object router 508, applications may communicate without incurring performance penalties associated with protocols that are typically required when data is exchanged between separate machines or computers.

In one embodiment, objects in one heap 504 may also include pointers to objects in another heap 504. Specifically, objects in one heap 504 may reference objects in another heap 504 without referencing object router 508, e.g., objects in different heaps 504 may reference each other substantially directly. As shown, object A 512 may include a pointer 520 that references object B 516. It should be understood that when object A 512 references object B 516 using a pointer 520, changes to both heaps 504, particularly those which involve either object A 512 or object B 516, are generally implemented substantially simultaneously. In other words, objects 512, 516 are dealt with substantially simultaneously in order to prevent the removal of necessary or otherwise referenced objects.

Heap manager 226 may also increase the size of a heap that is associated with an active application or job, e.g., heap 504a, by decreasing the size of a heap that is associated with an inactive application or job, e.g., heap 504b. By way of example, if heap 504a is associated with an active job while heap 504b is associated with an inactive job, and heap 504a requires additional heap space, then space from heap 504b may be reassigned to heap 504a. In other words, the size of a heap 504 may be dynamically altered. By dynamically resizing heaps 504, the heap space associated with heap 504b may be allocated for used by another heap 504a in order to prevent the job associated with the heap 504a from effectively dying when not enough heap space is available. The amount of overall heap space available is typically limited by hardware, e.g., the overall amount of computer memory available in a computing system.

As shown, a unit of heap allocation 530 is effectively "removed" from heap 504b, and is allocated to heap 504a. In effect, the size of heap 504a, which is associated with an active application, may be increased at the expense of heap 504b, which is associated with an inactive application. It should be understood that heap manager 226 may persist substantially all of heap 504b and unload persisted heap 504b, thereby providing heap 504a with substantially all memory associated with heap 504b, when the amount of overall available memory is low.

Periodically, garbage collection is performed on a heap, e.g., heap 504a, in order to remove unused, or dead, objects such that the memory allocated to those objects may be reallocated. In general, it should be understood that a garbage collector may be implemented with respect to a virtual machine created using substantially any suitable language, including, but not limited to the C programming language, the C++ programming language. In the described embodiment, for purposes of discussion, it is assumed that the virtual machine is implemented in the Java™ programming language. Implementing a virtual machine, e.g., a recursive virtual machine, in the Java™ programming language enables the virtual machine to be portable and, further, may significantly reduce the footprint associated with the virtual machine due to the compactness of Java™ byte codes. It should be appreciated that a virtual machine that is implemented using predominantly the Java™ programming language may use a relatively small portion of native code for interface with an underlying operating system or hardware. A recursive virtual machine, as will be understood by those skilled in the art, enables parts of a virtual machine to be executed on the same virtual machine. By way of example, a garbage collector written in the Java™ programming language may be executed on a virtual machine while collecting garbage on other parts of the virtual machine.

In one embodiment, when a garbage collector which performs garbage collection on a heap associated with a job is written primarily in the Java™ programming language, then a second garbage collector is typically needed to allocate and to collect objects created by the original garbage collector. When the second garbage collector is written primarily in the Java™ programming language, then it too may need a garbage collector to allocate and to collect objects that it creates. Although such a garbage collection scheme is effective, by implementing separate heaps for each job of the virtual machine, substantially only two types of garbage collectors, e.g., a garbage collector for each job and a "system" garbage collector, may be needed.

Figure 6:
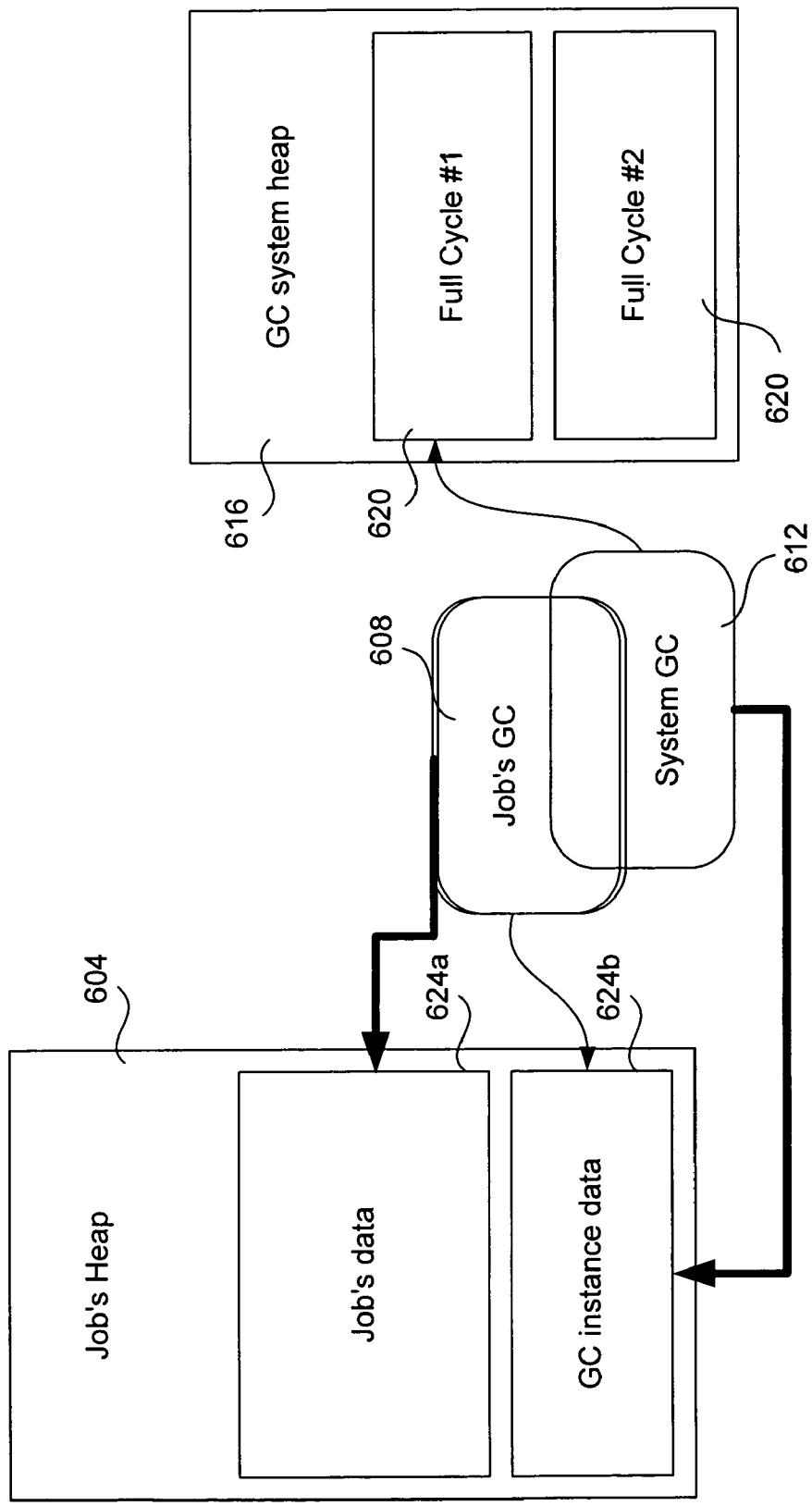
FIG. 6 is a diagrammatic representation of the functionality of a recursive garbage collector in accordance with an embodiment of the present invention.

FIG. 6 is a diagrammatic representation of a job heap and a garbage collector which collects unused objects from the heap in accordance with an embodiment of the present invention in which a virtual machine is implemented in the Java™ programming language. As previously discussed, although a virtual machine is described as being implemented in the Java™ programming language, it should be appreciated that a virtual machine may generally be implemented in substantially any suitable programming language, e.g., the C or C++ programming languages.

A virtual machine, which, in one embodiment, may be written substantially only in the Java™ programming language, creates an instance 608 of a garbage collector for each job or, more specifically, for each heap 604 of a job. Heap 604 may include a section 624*a* that contains data that relates to a job and a section 624*b* that contains data related to instance 608 of the garbage collector for the job. Generally, any suitable garbage collector may be used, as for example an incremental garbage collector. Suitable garbage collectors are described in *Garbage Collection: Algorithms for Automatic Dynamic Memory Management* by Richard Jones and Rafael Lins (John Wiley & Sons Ltd., 1996), which is incorporated herein by reference in its entirety. Instance 608 is arranged to perform a garbage collection on section 624*a* of heap 604.

In addition to instance 608 of a garbage collector for heap 604, an instance 612 of a system garbage collector is also created. Instance 612 "serves" instance 608, and allocates garbage collection data on section 624*b* of heap 604, in that instance 612 performs garbage collection on section 624*b*. Instance 612 of system garbage collector is allocated on a system garbage collection heap 616. System garbage collection heap 616 is divided into sections 620 that may each be dynamically expanded. While the size of sections 620 may vary widely, the size is typically such that sections 620 are at least as large as the amount of native threads. Unlike instance 608, instance 612 is typically not an instance of an incremental garbage collector.

When instance 612 is invoked to perform garbage collection on section 624*b* of heap 604 that contains garbage collection instance data, instance 612 may perform a collection cycle. Further, instance 612 may allocate data on an available section 620 of system heap 616. It should be understood that when a full collection cycle is completed over section 624*b*, then section 624*b* may be marked as a free section that is available for reallocation. Section 624*b* may be identified as being free in some embodiments because there is essentially no need to maintain garbage collection instance data between cycles of instance 612, i.e., system garbage collection cycles.

Figure 7:
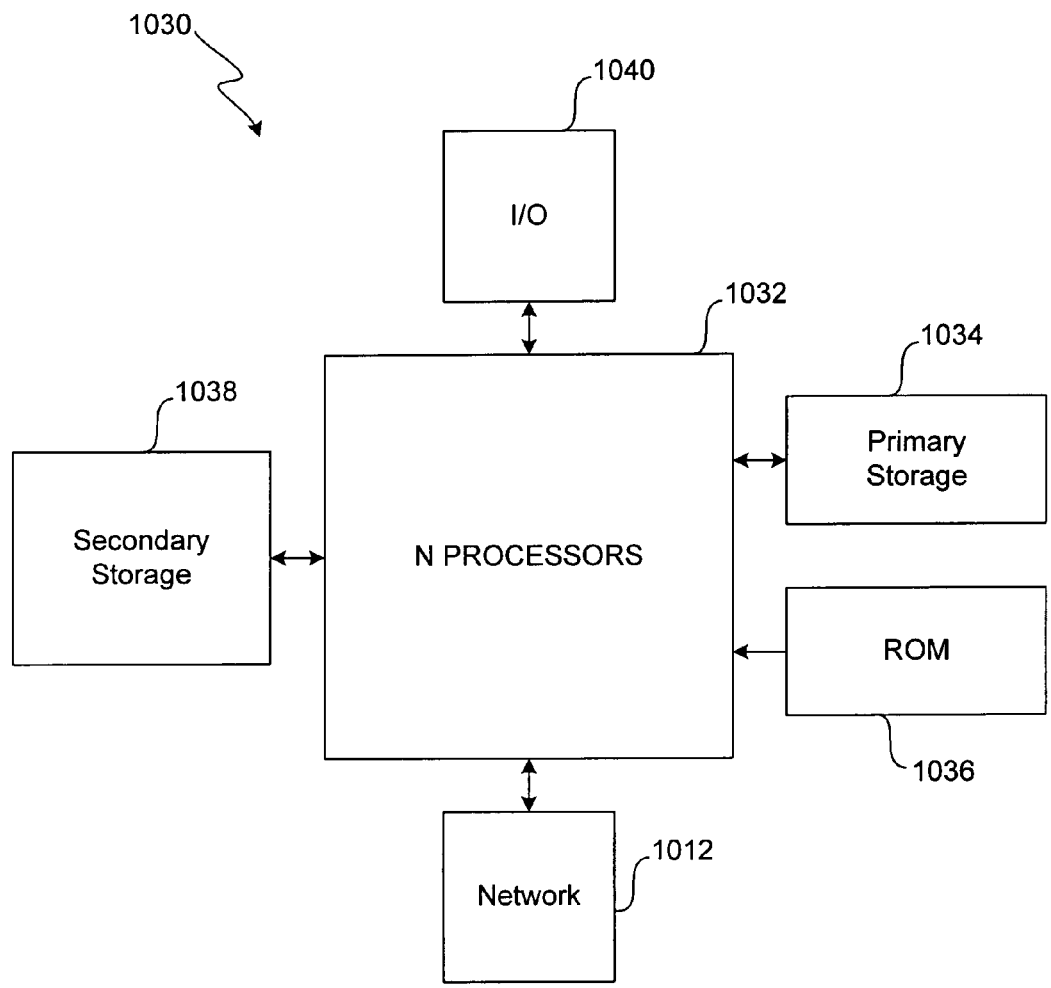
FIG. 7 is a diagrammatic representation of a computer system suitable for implementing the present invention.

FIG. 7 illustrates a typical, general-purpose computer system suitable for implementing the present invention. Specifically, FIG. 7 illustrates a computer system on which a virtual machine of the present invention may operate. The computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). Processor 1032 may execute instructions associated with a virtual machine and with applications. Primary storage devices 1034 may include dynamically allocated memory, i.e., memory associated with heaps allocated by a virtual machine.

Computer system 1030 or, more specifically, CPU 1032, may be arranged to support a virtual machine, as will be appreciated by those skilled in the art. As is well known in the art, ROM acts to transfer data and instructions unidirectionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The data storage capacity provided by secondary storage medium 1038 generally includes dynamically allocated memory. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the invention. By way of example, a virtual machine has generally been described as being suitable for allowing the execution of more than one application created using the Java™ programming language. It should be appreciated, however, that applications using other programming languages may also be executed using the virtual machine of the present invention.

A virtual machine may generally be created using any suitable computing language. Suitable computing languages include, but are not limited to, the C computing language, the C++ computing language, and the Java™ programming language. By way of example, a virtual machine created using the C or C++ computing languages may execute more efficiently than a virtual machine created using. However, a virtual machine created using the Java™ programming language is portable and, hence, may be readily ported between different platforms. Further, when the virtual machine is substantially fully implemented using the Java™ programming language, with the exception of native code that interfaces with an underlying operating system or hardware, the amount of memory space occupied by the virtual machine may be minimized, as Java™ byte codes are generally compact. In one embodiment, a virtual machine may be created using a combination of the C computing language, the C++ computing language, and the Java™ computing language.

In general, any suitable garbage collector may be used to perform garbage collection on heaps associated with jobs. Suitable garbage collectors may include, but are not limited to, scavenging and incremental garbage collectors. Similarly, while a system garbage collector that garbage collects on a system heap has generally been described as being an incremental garbage collector, the system garbage collector may also be varied widely without departing from the spirit or the scope of the present invention.

While a virtual machine has been described as including an instance of a garbage collector for each job heap, in addition to a system garbage collector for a system heap, it should be appreciated that some systems may not use a system garbage collector. For example, in some systems, in lieu of a system garbage collector, an instance of a garbage collector that is used for each job heap may be used to perform a garbage collection on the system heap and any "sub-heaps" associated with the system heap.

A single virtual machine has been described as being both modular and capable of starting more than one job. In one embodiment, however, a modular virtual machine may start only one job without departing from the spirit or the scope of the present invention. The use of a modular virtual machine, as mentioned above, enables changes to a virtual machine to be readily made. In addition, entire modules of a modular virtual machine may be swapped out or replaced as necessary, substantially without necessitating changes to other modules.

Alternatively, a virtual machine which is capable of starting more than one job may not necessarily be modular. By way of example, the present invention may be embodied as a substantially monolithic virtual machine which is suitable for starting more than one job.

While the creation of more than one job on a single virtual machine has generally been described as creating two jobs using a job manager of virtual machine, it should be understood that any number of jobs may be created on a virtual machine of the present invention. For example, a modular virtual machine may only have one job executing thereon. Alternatively, a virtual machine may have many more than two jobs executing thereon without departing from the spirit or the scope of the present invention.

The virtual machine of the present invention has been described as including a jobs manager, a class manager, and a heap manager. While the jobs manager, class manager, and heap manager may be separate components of the virtual machine, in one embodiment, at least two of the components may be integrated as a single component. By way of example, the functionality of a jobs manager and the functionality of a heap manager may be combined into a single component. Further, a virtual machine or, more specifically, a modular virtual machine, may include a variety of other components or modules without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computing system, the computing system including:
   a processor;
   a memory;
   a virtual machine which is in communication with the processor, the virtual machine being arranged to enable two or more jobs, which are associated with two or more different applications, to run concurrently on the virtual machine, wherein the virtual machine is further arranged to create a heap in the memory for each one of the two or more jobs that concurrently run on the virtual machine;
   wherein the virtual machine includes a jobs manager, a class manager, and a heap manager;
   wherein the jobs manager generates first and second jobs data, first and second garbage collection instance data, and virtual machine instance data respectively associated with said two or more jobs that concurrently run on the virtual machine, and the jobs manager further associates one or more methods to each of the jobs data, garbage collection instance data, and virtual machine instance data; and
   wherein the class manager is arranged to create proxy data which enables a class associated with the virtual machine to be shared by the two or more jobs that are arranged to concurrently run on the virtual machine.

2. A computing system according to claim 1 wherein the virtual machine is scaleable.

3. A computing system according to claim 1 wherein the heap manager manages substantially all heaps in the memory that are created by the virtual machine.

4. A computing system according to claim 3 wherein the heap manager is arranged to allow an object allocated on a first heap created by the virtual machine to be visible to a second heap created by the virtual machine.

5. A computing system according to claim 4 wherein the heap manager uses an object router to exchange data between the first heap and the second heap.

6. A computing system according to claim 1 wherein the virtual machine is further arranged to enable information to be exchanged between the one or more jobs that are arranged to run on the virtual machine.

7. A computing system according to claim 1 wherein the virtual machine is a Java compliant virtual machine.

8. A computing system according to claim 1 wherein the virtual machine is associated with a system heap, and the virtual machine is further arranged to create a system garbage collector, the system garbage collector being arranged to perform garbage collection on the system heap.

9. A computing system according to claim 8 wherein the virtual machine is further arranged to create an incremental garbage collector for each heap created in the memory, the incremental garbage collector for each heap being arranged to perform garbage collection on its associated heap.

10. A virtual machine arranged to operate in cooperation with a computing system, the virtual machine including:
a first mechanism for creating a first job and a second job which are respectively associated with a first application and a second application, the first job and the second job being arranged to concurrently run on the virtual machine;
a second mechanism, the second mechanism being arranged to provide the at least one job with at least one class that is arranged to be shared between the first job and the second job;
a third mechanism, the third mechanism being arranged to exchange information between the first job and the second job;
wherein the virtual machine includes a jobs manager, a class manager, and a heap manager;
wherein the jobs manager generates first and second jobs data, first and second garbage collection instance data, and virtual machine instance data respectively associated with said first and second jobs that concurrently run on the virtual machine, and the jobs manager further associates one or more methods to each of the jobs data, garbage collection instance data, and virtual machine instance data; and
wherein the class manager is arranged to create proxy data which enables a class associated with the virtual machine to be shared by the first and second jobs that are arranged to concurrently run on the virtual machine.

11. A virtual machine according to claim 10 wherein the first mechanism is further arranged to create a first heap associated with the first job and a second heap associated with the second job, and the third mechanism is further arranged to increase a size of the first heap and to decrease a size of the second heap.

12. A virtual machine according to claim 11 further including a first garbage collector and a second garbage collector, wherein the first garbage collector is arranged to perform a garbage collection on the first heap and the second garbage collector is arranged to perform a garbage collection on the second heap.

13. A virtual machine according to claim 11 wherein the size of the first heap and the size of the second heap may be dynamically altered.

14. A virtual machine according to claim 10 wherein at least one of the first job and the second job includes data which is persisted.

15. A computer-implemented method for executing a first application substantially concurrently with a second application on a virtual machine, the computer-implemented method comprising:
creating a first job on a virtual machine, the first job being associated with the first application;
creating a second job on the virtual machine, the second job being associated with the second application;
creating a first heap, the first heap being associated with the first job; and
creating a second heap, the second heap being associated with the second job
creating a jobs manager for concurrently supporting the first and second jobs on the virtual machine, wherein the jobs manager generates first and second jobs data, first and second garbage collection instance data, and virtual machine instance data respectively associated with said two or more jobs that concurrently run on the virtual machine, and the jobs manager further operating to associate one or more methods to each of the jobs data, garbage collection instance data, and virtual machine instance data; and
creating a class manager which is arranged to create proxy data which enables a class associated with the virtual machine to be shared by the two or more jobs that are arranged to concurrently run on the virtual machine.

16. A computer-implemented method as recited in claim 15, wherein the size of the first heap and the size of the second heap may be dynamically altered.

17. A computer-implemented method as recited in claim 15, wherein at least one of the first job and the second job includes data which is persisted.

18. A computer-implemented method as recited in claim 15, further comprising:
creating a first garbage collector and a second garbage collector, wherein the first garbage collector is arranged to perform a garbage collection on the first heap and the second garbage collector is arranged to perform a garbage collection on the second heap.

19. A computer readable medium including computer program code for executing a first application substantially concurrently with a second application on a virtual machine, the computer readable medium, comprising:
computer program code for creating a first job on a virtual machine, the first job being associated with the first application;
computer program code for creating a second job on the virtual machine, the second job being associated with the second application;
computer program code for creating a first heap, the first heap being associated with the first job; and
computer program code for creating a second heap, the second heap being associated with the second job
computer program code for creating a jobs manager for concurrently supporting the first and second jobs on the virtual machine, wherein the jobs manager generates first and second jobs data, first and second garbage collection instance data, and virtual machine instance data respectively associated with said two or more jobs that concurrently run on the virtual machine, and the jobs manager further operating to associate one or more methods to each of the jobs data, garbage collection instance data, and virtual machine instance data; and
computer program code for creating a class manager which is arranged to create proxy data which enables a class associated with the virtual machine to be shared by the two or more jobs that are arranged to concurrently run on the virtual machine.

20. A computer readable medium as recited in claim 19, wherein the size of the first heap and the size of the second heap may be dynamically altered.

21. A computer readable medium as recited in claim 19, wherein at least one of the first job and the second job includes data which is persisted.

22. A computer readable medium as recited in claim 19, further comprising:
computer program code for creating a first garbage collector and a second garbage collector, wherein the first garbage collector is arranged to perform a garbage collection on the first heap and the second garbage collector is arranged to perform a garbage collection on the second heap.

* * * * *